US006879447B2

(12) United States Patent
Casteleiro

(10) Patent No.: US 6,879,447 B2
(45) Date of Patent: Apr. 12, 2005

(54) OPTICAL GIMBAL APPARATUS

(75) Inventor: Carlos A. Casteleiro, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/428,024

(22) Filed: May 2, 2003

(65) Prior Publication Data

US 2004/0218287 A1 Nov. 4, 2004

(51) Int. Cl.[7] .................................................. G02B 17/00
(52) U.S. Cl. ........................................ 359/726; 359/730
(58) Field of Search ................................ 359/618, 633, 359/726, 730, 364–366, 555, 556, 605, 607

(56) References Cited

U.S. PATENT DOCUMENTS 3,724,953 A * 4/1973 Johnston, Jr. ............... 356/153
3,761,158 A * 9/1973 Humphrey ................. 359/555
4,174,159 A * 11/1979 Kraft et al. ................. 396/432
4,386,848 A 6/1983 Clendenin et al.
4,413,177 A * 11/1983 Godwin et al. .......... 250/201.1
4,717,822 A 1/1988 Byren
4,729,647 A 3/1988 Goldmunz et al.
4,867,548 A 9/1989 Andrews et al.
5,637,873 A * 6/1997 Davis et al. ........... 250/339.11
5,936,771 A 8/1999 Cooper
5,973,309 A 10/1999 Livingston
6,020,955 A 2/2000 Messina
6,097,860 A * 8/2000 Laor ........................... 385/17
6,115,196 A 9/2000 Decker
6,129,307 A 10/2000 Deoms et al.
6,174,061 B1 1/2001 Cooper
6,226,125 B1 5/2001 Levy et al.

* cited by examiner

*Primary Examiner*—Ricky Mack
(74) *Attorney, Agent, or Firm*—Burns, Doane, Swecker & Mathis, L.L.P.

(57) ABSTRACT

An optical gimbal apparatus has a housing having a first reflector fixed with respect to the housing and having an aperture for transmission or reception of optical energy, and a gimbal having a second reflector arranged along an axis of rotation of the gimbal assembly arranged to rotate the second reflector about the axis of rotation. The second reflector is angled with respect to the axis of rotation and establishing an optical path along the axis of rotation. Additional lenses can be arranged between the first reflector and the second reflector, and between the first reflector and the aperture.

24 Claims, 5 Drawing Sheets

100
130
130
142
152
156
176
136
122
139
178
138
H
140
140
154
123
158
120
120
170
120
146
144
142
124
174
134
L 100
120
122
124
130
136
139
140
142
144
174
176
178
Input/Output Path

OPTICAL GIMBAL APPARATUS

BACKGROUND OF THE INVENTION

1. Field of the Invention

The invention relates to a gimbal assembly for an optical imaging system.

2. Background Information

Optical imaging systems can be mounted externally to an aircraft for detection and targeting, and can include a structure, such as an optical bed, with associated gimbal drive assemblies. Laser systems with output of the desired wavelength can be used as the illumination or designation source.

Some current imaging systems locate most or all of the optical components within the optical bed, and mount the optical bed on a two axis gimbal, so the entire optical bed is movable. An example of an imaging system for a tracked vehicle which includes both a laser transmitter and a laser receiver mounted to a gimballed support is found in U.S. Pat. No. 5,973,309 (Livingston). U.S. Pat. No. 6,226,125 B1 (Levy), and U.S. Pat. No. 5,936,771 (Cooper), are examples of imaging systems which are contained within a spherical housing which rotates on a gimbal base.

SUMMARY OF THE INVENTION

An optical gimbal apparatus has a housing having a first reflector fixed with respect to the housing and having an aperture for transmission or reception of optical energy, and a gimbal having a second reflector arranged along an axis of rotation of the gimbal assembly arranged to rotate the second reflector about the axis of rotation. The second reflector is angled with respect to the axis of rotation and establishing an optical path along the axis of rotation. Additional lenses can be arranged between the first reflector and the second reflector, and between the first reflector and the aperture.

BRIEF DESCRIPTION OF THE FIGURES

Other objects and advantages of the present invention will become apparent to those skilled in the art upon reading the following detailed description of the preferred embodiments, in conjunction with the accompanying drawings, wherein like reference numerals have been used to designate like elements.

DETAILED DESCRIPTION OF PREFERRED EMBODIMENTS

Figure 1:
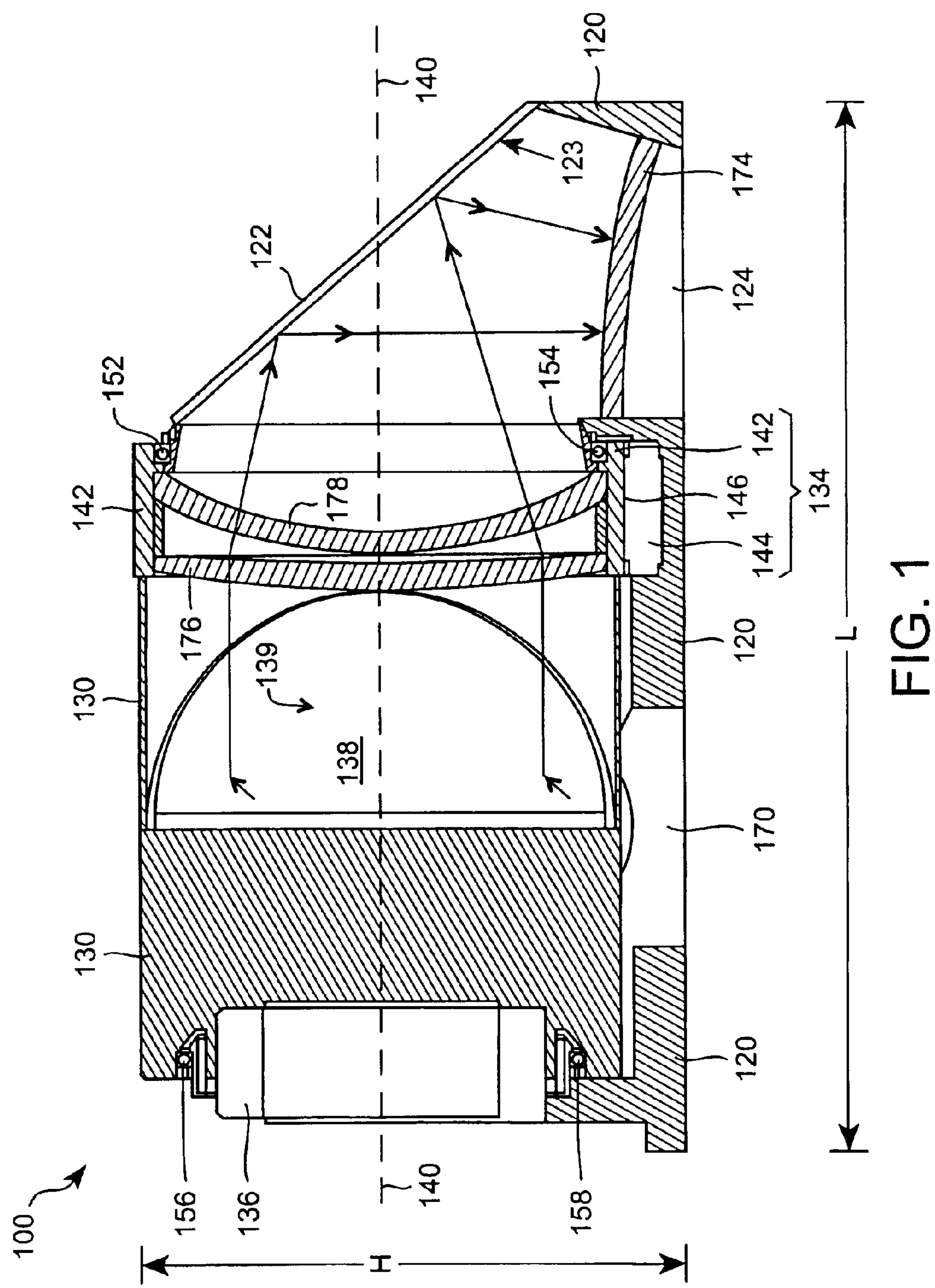
FIG. 1 illustrates a cut away view of an exemplary embodiment of an optical system.

FIG. 1 illustrates an exemplary embodiment of the present invention as an optical system. In the FIG. 1. embodiment, the optical system is an optical gimbal apparatus 100 suitable for receiving optical energy from the environment and for transmitting the received energy to a further optical device for processing. The apparatus 100 can also transmit optical energy, such as, for example, laser energy, from the further device to the environment. The further device can be, for example, an optical receiver or a laser generator.

In the FIG. 1 embodiment, a reflector 122 is stationary with respect to a housing 120. The reflector 122 can be any type of material suitable to reflect optical energy at the desired wavelengths, and in an exemplary embodiment, can have a planar reflective surface 123 which is reflective of a desired optical wavelength. The reflector 122 can be fixed to the housing 120, can be integral with the housing 120, and/or be arranged at least partially within the housing 120.

The housing 120 also includes an aperture 124 through which optical energy can pass between the reflector 122 and an exterior of the housing. In an exemplary embodiment, the housing is adjacent to another optical component, and the aperture 124 is in an optical path between the reflector 122 and an external optical device, for example, a laser or a receiver.

A gimbal 130 is a rotatable assembly arranged for rotation about an axis of rotation 140, with the axis of rotation intersecting the reflector 122. The housing 120 is stationary with respect to the axis of rotation 140. As used herein, the terms gimbal 130 and elevation gimbal 130 are used interchangeably. The apparatus 100 can be used in a more complex optical system for mounting on a vehicle such as an aircraft, and which includes a second gimbal assembly which rotates the elevation gimbal around an axis perpendicular to the axis of rotation of the elevation gimbal. Such an apparatus is discussed in copending U.S. application Ser. No. 10/263,660, filed Oct. 4, 2002, the entire disclosure of which is incorporated herein by reference. However, the gimbal 130 can be used in any number of configurations and is not limited to use in such an optical system.

In an exemplary embodiment, the reflector 122 is arranged to reflect or "fold" incident optical energy received through the aperture 124 along the axis of rotation 140. Similarly, optical energy transmitted along the axis of rotation 140 toward the reflector 122 will be reflected or "folded" toward the aperture 124. By the term "along the axis of rotation" it is meant coincident with the axis of rotation 140 or in a direction approximately parallel to the axis of rotation 140.

Figure 2:
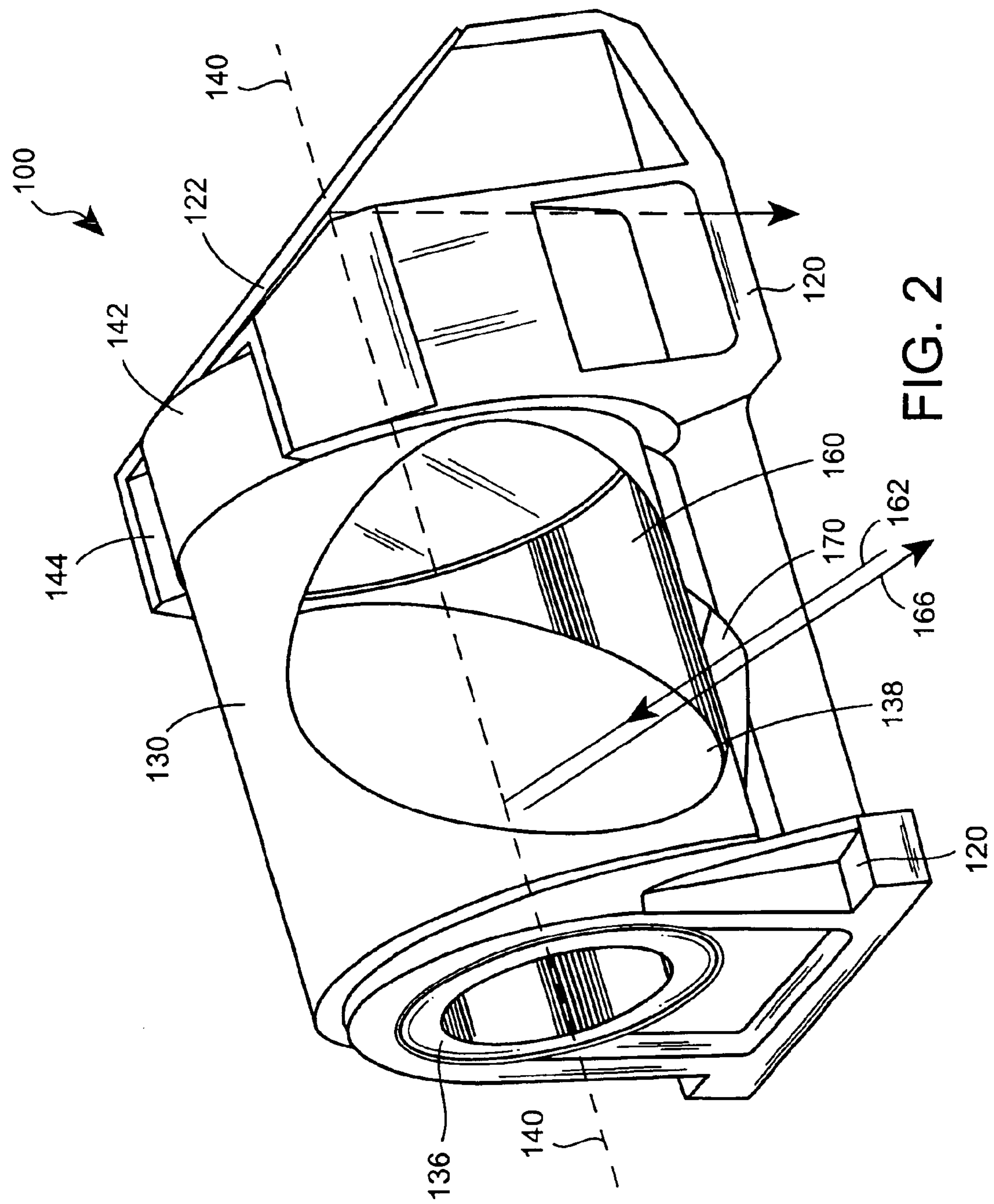
FIG. 2 is perspective view of the exemplary FIG. 1 optical system.

A driver can be arranged for rotating the optical gimbal 130 about the axis of rotation 140. The driver can be any device suitable for rotating the optical components about an axis 140, including, but not limited to, a torque motor 134. As illustrated in FIG. 1, the torque motor 134 can include both a stator 144 and a rotor 142. In an exemplary embodiment, the stator 144 is at least partially arranged within the housing 120, and is stationary with respect to the housing. A resolver 136 can also be included to provide feedback, for example, of the speed and position of the assembly 130, to the torque motor 134. As illustrated in FIGS. 1 and 2, the rotor 142 is fixed to the optical gimbal assembly 130, and can be positioned against an inner peripheral surface 146 of the stator 144.

Bearings 152, 154, 156, and 158 can be arranged between the rotor 142 and the housing 120, and between the resolver 136 and the optical gimbal assembly 130, for alignment and to allow movement of the optical gimbal assembly 130.

The optical gimbal assembly 130 also includes a reflector 138, which is arranged at the axis of rotation 140 so that its generally planar reflective surface 139 intersects the axis of rotation 140. A path is formed between the reflective surfaces 139 and 123. The reflector 138 rotates with the gimbal 130 around the axis of rotation 140, while the reflector 122 remains stationary with respect to the axis of rotation 140. Both the reflective surface 139 and the reflective surface 123 are positioned at an angle with respect to the axis of rotation 140. The angles between the reflective surface 123 and the axis 140 and the reflective surface 139 and the axis can be the same or different.

At least one lens element can advantageously be arranged between the reflector 122 and the reflector 138 so that light transmitted along the axis of rotation will pass through the lens element. In an exemplary embodiment, a first lens 176 and a second lens 178 are arranged in the gimbal 130 to rotate with the gimbal 130 around the axis of rotation. In the embodiment illustrated in FIG. 1, the second lens 178 is arranged between the first lens 176 and the reflector 122. In an exemplary embodiments, the first lens 176 and the second lens 178 are afocal lenses. As illustrated in FIG. 1, the reflector 138 is located very close to the lens element 176.

The arrangement of the first and second lenses 176 and 178 between the reflectors 122 and 138 can allow the reflectors to be arranged more closely together than otherwise possible, which can reduce the height H and length L of the apparatus 100.

In an exemplary embodiment, the first lens 176 is an objective lens. The first lens 176 and the second lens 178, or either of them can have a prescription. In an exemplary embodiment, the first lens 176 and the second lens 178 can be arranged at least partially within the torque motor rotor 142. The first lens and the second lens can be affixed within an inner diameter of the torque motor rotor 142.

Figure 3:
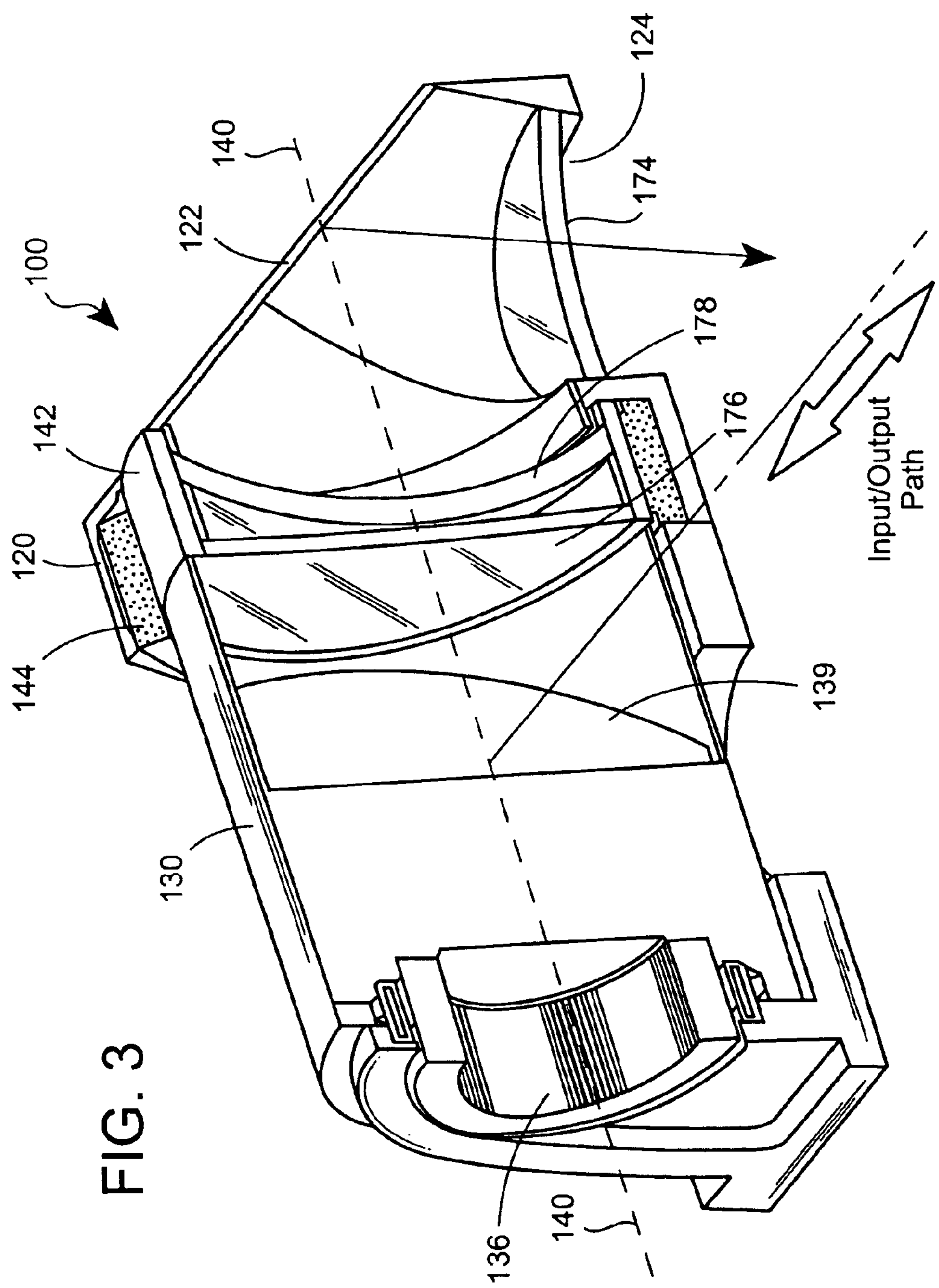
FIG. 3 is a perspective cut away view of the exemplary FIG. 1 optical system.

Although two lenses 176 and 178 are illustrated in FIGS. 1 and 3, greater or fewer lenses may also be used. For instance, the apparatus 100 shown in FIGS. 1 and 3 includes an afocal lens 174 arranged between the reflector 122 and the aperture 124 and attached to the housing 120.

In an exemplary embodiment, the gimbal 130 is generally cylindrical in shape, and the reflective surface 139 of the reflector 138 is generally elliptical in shape.

Referring next to FIGS. 2 and 3, an aperture 160 in a side surface of the gimbal 130 is generally aligned with the reflector 138. The aperture 160 rotates with the gimbal 130 and the reflector 138. Optical radiation 162 received from the environment through the aperture 160 will be reflected by the reflector 138 in a direction along the axis of rotation 140 toward the reflector 122. Similarly, optical radiation 166 which travels from the reflector 122 along the axis of rotation 140 toward the reflector 138 is reflected by the reflector 138 toward the aperture 160 so the reflected optical radiation 166 can travel through the aperture 160 to the environment external to the apparatus 100.

The aperture 160 can be generally circular in shape, or can be any shape suitable to allow optical radiation to pass between the environment and the reflective surface 139.

The aperture 160 can be an opening in the surface of the gimbal 130, and can, if desired, include a covering formed of material which is transmissive of optical energy.

In an exemplary embodiment, the gimbal 130 can rotate 360° around the axis of rotation 140. Alternatively, the gimbal 130 rotates a smaller angle around the axis of rotation 140. It is preferred that the gimbal 130 rotates a sufficiently large angle around the axis of rotation 140 so that the aperture 160 will be turned toward a large portion of the environment intended to be optically scanned, thus providing a large field of regard.

As the gimbal 130 rotates, an optical path is formed between the environment external to the aperture 160 and the aperture 124 in the housing 120. Optical radiation 162 received from the environment enters the gimbal through the aperture 160 and is incident on the reflective surface 139. The reflective surface 139 reflects the optical radiation 164 toward the reflective surface 123 of the reflector 122. The reflective surface 123 then reflects the optical radiation in a direction toward the aperture 124. Similarly, optical radiation can be directed through the aperture 124 to the reflective surface 123, and the reflected optical radiation is then reflected along the axis of rotation 140 toward the reflective surface 139, where it is reflected toward and through the aperture 160. As the gimbal 130 rotates, the optical radiation 166 which travels through the aperture 160 to the environment sweeps across an arc formed by the rotation of the gimbal 130. Similarly, the rotation of the gimbal 130 allows the apparatus 100 to receive optical radiation from different directions along the arc as the reflector 138 rotates with the gimbal 130 about the axis 140.

In an exemplary embodiment, the laser energy can be scanned across the environment through at least 180°. Similarly, when the optical system is receiving optical energy from the environment, it can receive optical energy through at least an 180° angle.

In an exemplary embodiment, the housing 120 includes an additional aperture 170, generally aligned with the reflector 138 and the optical gimbal assembly's aperture 160 when the gimbal 130 is rotated to a position so the aperture 160 faces toward the aperture 170. A boresight module located external to the housing, for example in an additional optical subsystem, can calibrate the system by passing a calibrated signal along an optical path between the aperture 124, the reflective surfaces 123 and 139, and the aperture 170.

In an exemplary embodiment, the reflective surface 139 and 123 are angled at about 45 degrees with respect to the axis 140, although these angles may be greater or lesser, and they may be unequal to each other.

Figure 4:
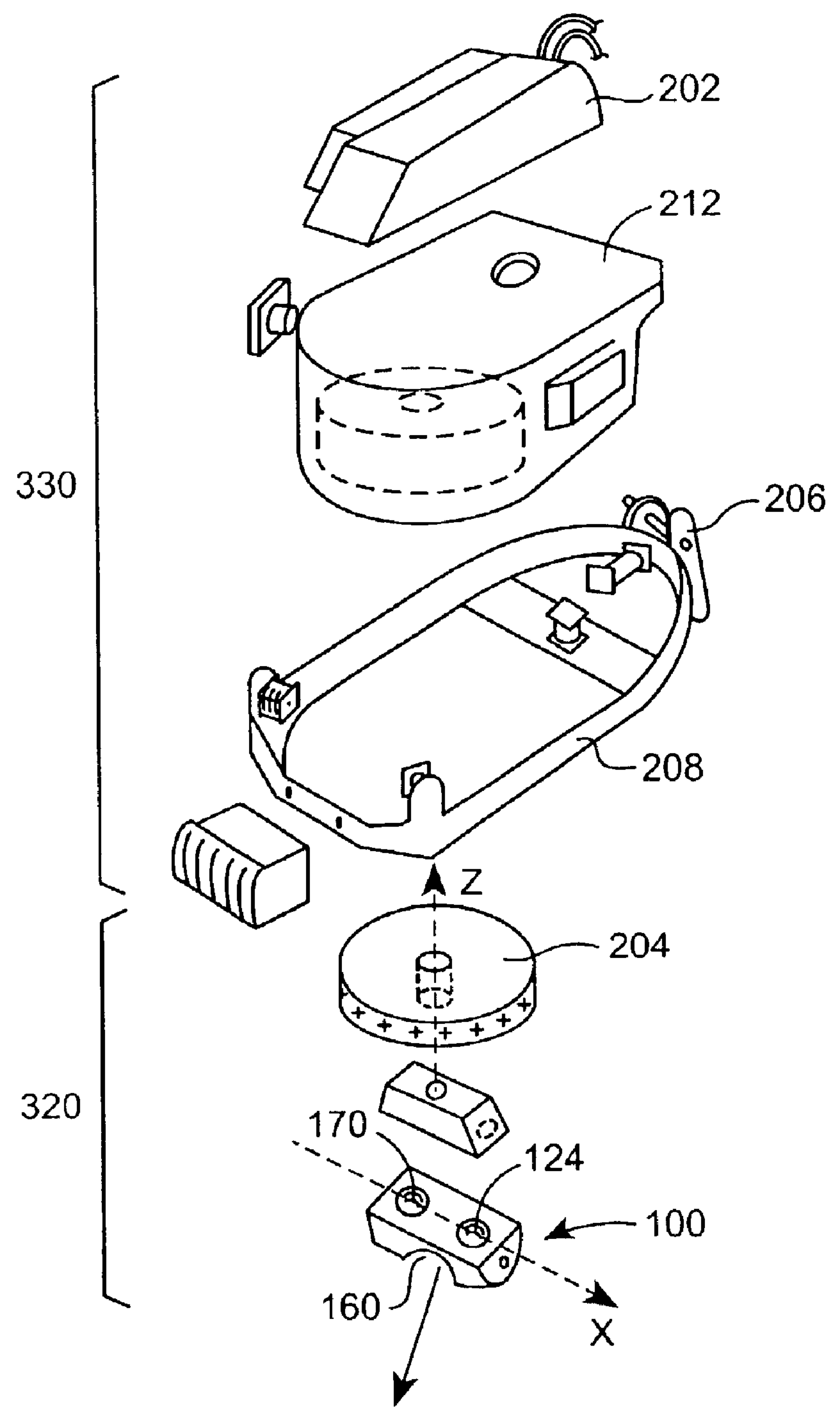
FIG. 4 is an exploded view of the exemplary FIG. 1 optical system in combination with other optical components.
Figure 5:
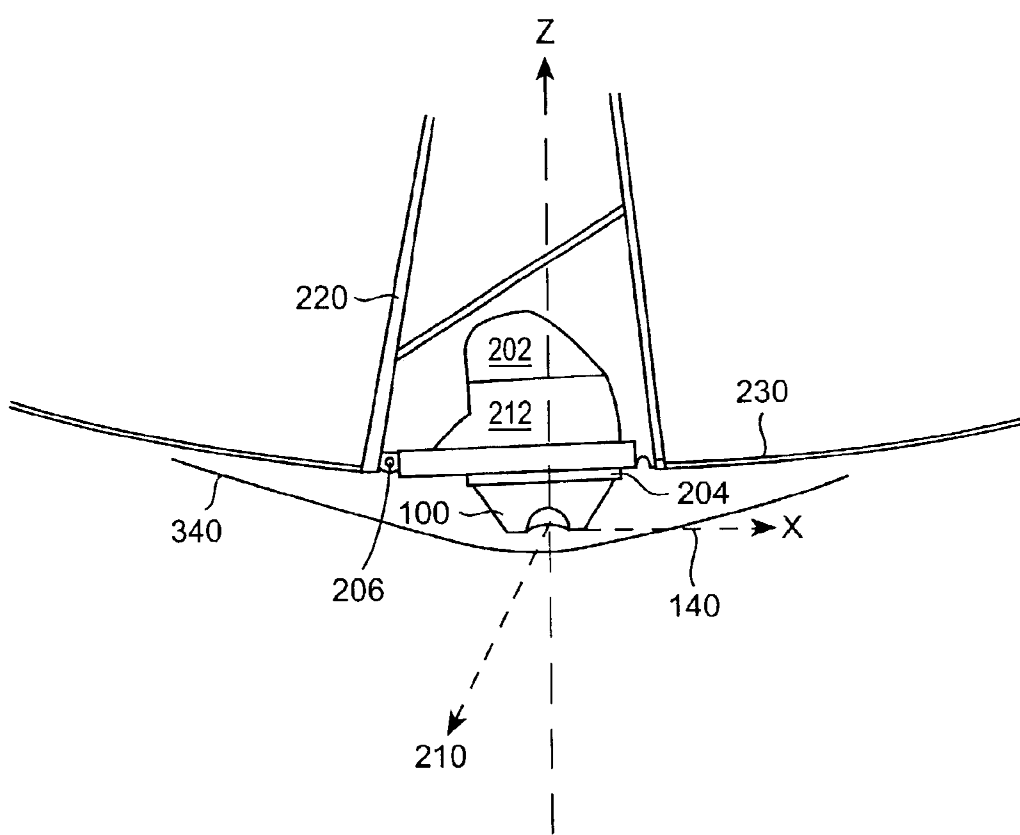
FIG. 5 is a side view of the exemplary FIG. 1 optical system in combination with other optical components in a mounted position.

The apparatus 100 can be used as a stand-alone system, or in an exemplary embodiment illustrated in FIGS. 4 and 5, the apparatus 100 can be a component of a larger imaging or targeting system 200.

In the embodiment illustrated in FIG. 5, the system 200 is attached to the vehicle frame 220 with a hinge mechanism 222, although the system could be attached in various ways to the frame 220 or other structures of the vehicle as desired, and any suitable mounting mechanism can be used.

In an exemplary embodiment, the optical system 100 is part of a larger imaging or targeting system 200 which includes both a laser transceiver 202 and an azimuthal gimbal assembly 204. The azimuthal gimbal assembly 204 rotates the optical system's line of sight 210 around a z axis perpendicular to the axis of rotation 140 so the azimuthal gimbal assembly 204 and the optical system 100 together establish the field of regard in elevation and azimuth. The field of regard is limited only by any obscurations presented by the vehicle itself or other external obscurations. The optical system can have a full field of view of 360° azimuthally and 180° in elevation. Gimbals having less than 360 degrees of rotation can also be used. For example, gimbals having 180 degrees of rotation or even less will also provide a large field of regard.

The transmitted optical energy can be, for example, laser energy which is used for laser range finding, laser spot tracking, or infrared search and track functions, among others.

As illustrated in FIG. 5, the optical system 200 can be mounted a vehicle such that the optical system 100 extends only a small distance beyond the exterior surfaces of the vehicle, if at all, so the field of regard is not obstructed by the vehicle frame. Because the optical system 100 and the azimuthal gimbal assembly 204 define a large field of regard in a system which has a low profile, any detrimental effect on the vehicle's aerodynamic performance and RF signature is minimized.

The system 100 can extend below the vehicle frame a distance approximately equal to the diameter of the gimbal 130, or greater or lesser. In an exemplary embodiment, the gimbal 130 has a diameter of only about 5¼ inches, and an aperture size of approximately 5 inches, thus providing both a large field of regard, maximum aperture, and a low minimum profile.

In an exemplary embodiment illustrated in FIG. 4, the system 200 can also include a deroll/fast steering mirror assembly 262 positioned between the optical system 100 and the azimuthal gimbal assembly 202. The deroll/fast steering mirror assembly 262 can include a scanning mirror that rotates to provide a scan function for the laser, and particularly for a laser infrared search and track function. The deroll/fast steering mirror can also stabilize the laser beam in both the azimuthal and elevation directions to compensate for vehicle movement. The deroll/fast steering mirror assembly 262 can also include a deroll prism (not shown) that rotates the image transmitted from the rotating components 320 to the components within the non-rotating portion 330, so the stationary optical components (e.g. the "off-gimbal" components that are part of the non-rotating portion 320) receive an upright image.

The off-gimbal components can include a casing 212 which can advantageously house low-failure rate components, a laser transceiver 202, and a mounting interface 208. The azimuthal gimbal 204 can fit within a recess of the casing 212, and the casing can be shock-mounted to the mounting interface 208. The mounting interface 208 can be hinged to the vehicle frame, or attached by any other suitable attachment method.

It is advantageous to mount the optical system 200 in such a way that the optical system is protected from rain, dust, humidity, and other contaminants. For example, and as shown in FIG. 5, the optical system 200 can be arranged in a compartment formed by an external fairing 340, and the vehicle frame 220.

The portion of the external fairing 340 covering the optical system can be an optical window (e.g. substantially transparent to optical energy at the operational wavelengths of the system). An example of a suitable material for the optical window is sapphire, which has good optical properties and high strength, although other materials which are substantially optically transparent at desired wavelengths may also be used.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive, and the scope of the invention is to be determined by reference to the appended claims.

What is claimed is:

1. An optical gimbal apparatus comprising:

a housing having a first reflector fixed with respect to the housing and having an aperture for transmission or reception of optical energy, and a gimbal having a second reflector arranged along an axis of rotation of the gimbal assembly arranged to rotate the second reflector about the axis of rotation, the second reflector being angled with respect to the axis of rotation and establishing an optical path along the axis of rotation.

2. The optical gimbal apparatus as in claim 1, wherein the first reflector is angled with respect to the axis of rotation.

3. The optical gimbal apparatus as in claim 1, wherein the first reflector and the second reflector are positioned at an angle of about 45° with respect to the axis of rotation.

4. The optical gimbal apparatus as in claim 1, comprising at least one afocal lens arranged between the first reflector and the second reflector on the axis of rotation.

5. The optical gimbal apparatus according to claim 4, wherein the at least one afocal lens is arranged for rotation about the axis of rotation.

6. The optical gimbal apparatus as in claim 1, comprising:

at least one afocal lens arranged between the first reflector and the second reflector on the axis of rotation, the at least one afocal lens arranged for rotation about the axis of rotation.

7. The optical gimbal apparatus as in claim 1, comprising:

two afocal lenses arranged along the axis of rotation between the first reflector and the second reflector.

8. The optical gimbal apparatus as in claim 7, wherein the two afocal lenses are arranged for rotation about the axis of rotation.

9. The optical apparatus as in claim 1, comprising:

an afocal lens arranged between the first reflector and the aperture.

10. The optical apparatus as in claim 9, wherein the afocal lens is attached to the housing.

11. The optical apparatus as in claim 1, wherein the gimbal has a cylindrical shape and the second reflector has an elliptical shape.

12. The optical apparatus as in claim 1, further comprising:

a driver for rotating the gimbal about the axis of rotation.

13. The optical apparatus as in claim 12, wherein the driver includes a torque motor.

14. The optical apparatus as in claim 13, further comprising:

at least one afocal lens is arranged between the first reflector and the second reflector on the axis of rotation, for rotation about the axis of rotation, the at least one afocal lens being arranged at least partially within a stator of the torque motor.

15. The optical apparatus as in claim 13, further comprising:

two afocal lenses arranged between the first reflector and the second reflector on the axis of rotation, for rotation about the axis of rotation, the two afocal lenses being arranged at least partially within a stator of the torque motor.

16. The optical apparatus as in claim 13, wherein the torque motor is arranged between the housing and the gimbal assembly to drive the gimbal around the axis of rotation, and the optical apparatus further comprises a resolver for providing feedback to the torque motor.

17. The optical apparatus as in claim 1, further comprising:

a controller for regulating a rotation rate of the gimbal.

18. The optical apparatus as in claim 1, having a path between the first reflector and an exterior of the housing for transmitting optical energy between the first reflector and the exterior of the housing.

19. The optical apparatus as in claim 1 in combination with at least a gimbal drive assembly for driving the optical system about a second axis perpendicular to the axis of rotation.

20. The optical apparatus as in claim 19, comprising:

a scanning mirror optically positioned between the housing and the second gimbal drive assembly, wherein the scanning mirror steers a beam of laser energy in a search pattern during operation.

21. The optical apparatus as in claim 1 in combination with an optical window of a vehicle.

22. The optical apparatus as in claim 1, wherein the gimbal is approximately 180° rotatable about the axis of rotation.

23. The optical apparatus as in claim 1, wherein the gimbal is 360° rotatable at least about the axis of rotation.

24. The optical apparatus as in claim 1, wherein the axis of rotation is fixed relative the housing and the gimbal.

* * * * *

UNITED STATES PATENT AND TRADEMARK OFFICE

CERTIFICATE OF CORRECTION

PATENT NO. : 6,879,447 B2
DATED : April 12, 2005
INVENTOR(S) : Carlos A. Casteleiro It is certified that error appears in the above-identified patent and that said Letters Patent is hereby corrected as shown below:

Title page,
Item [54], Title, "OPTICAL GIMBAL APPARATUS" should read -- GIMBAL ASSEMBLY FOR OPTICAL IMAGING SYSTEM --; and Column 6,
Line 44, "at least one afocal lens is arranged" should read -- at least one afocal lens arranged --.

Signed and Sealed this

Sixth Day of September, 2005

JON W. DUDAS
*Director of the United States Patent and Trademark Office*